Oct. 28, 1924.

W. S. SIMPSON

ADJUSTABLE SWIVEL CASTER

Filed Sept. 23, 1922

1,513,643

Inventor
W. S. Simpson
By Frear and Bond
Attorneys

Patented Oct. 28, 1924.

1,513,643

UNITED STATES PATENT OFFICE.

WALTER S. SIMPSON, OF CANTON, OHIO, ASSIGNOR TO THE UNITED ELECTRIC COMPANY, OF CANTON, OHIO, A CORPORATION OF OHIO.

ADJUSTABLE SWIVEL CASTER.

Application filed September 23, 1922. Serial No. 590,124.

*To all whom it may concern:*

Be it known that I, WALTER S. SIMPSON, a citizen of the United States, residing at Canton, in the county of Stark and State of Ohio, have invented new and useful Improvements in Adjustable Swivel Casters, of which the following is a specification.

This invention relates to casters for the rear end of portable vacuum cleaners or similar use, wherein it is desirable to adjust the caster vertically with relation to the machine, to tilt the same upward or downward upon the forward wheels and wherein the vibration of the machine tends to change the adjustment of the caster; and the objects of the improvement are to provide a simple means for adjusting such a caster to any desired position and for stopping or holding it in the various positions.

More generally the invention involves means for adjusting two separable parts, one of which parts carries an adjusting plate pivotally connected thereto and provided with an irregular slot engaged by a clamping screw upon the other part whereby the parts may be separated or brought toward each other and held in any given position of adjustment.

An embodiment of the invention is illustrated in the accompanying drawings forming part hereof, in which—

Figure 1:
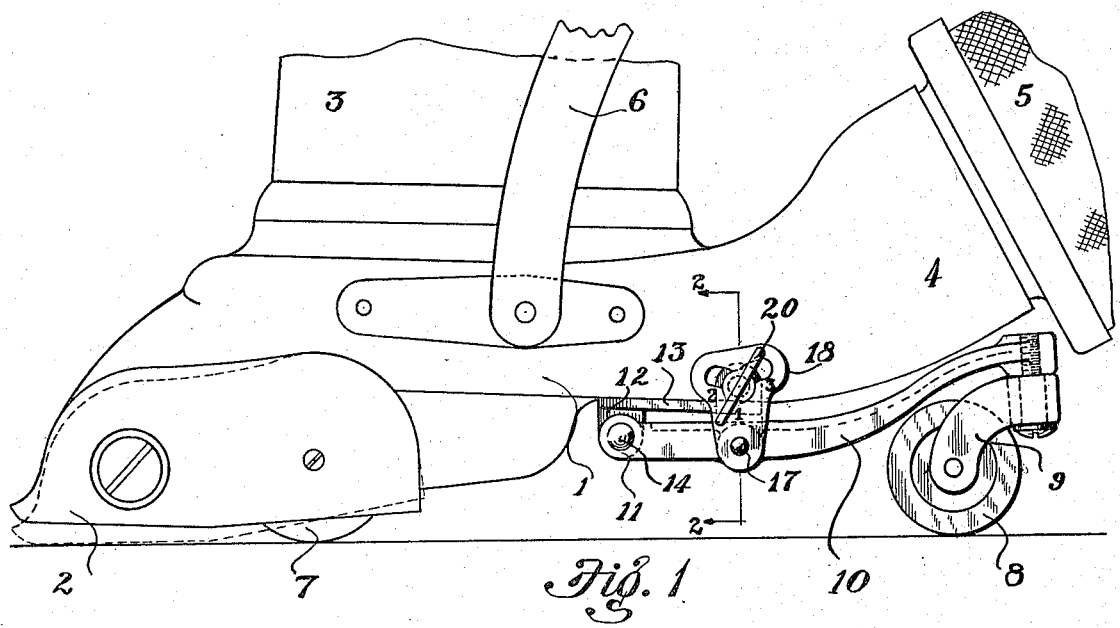
Figure 3:
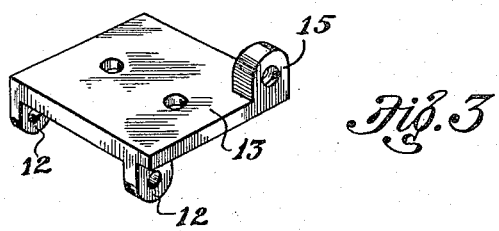
Figure 4:
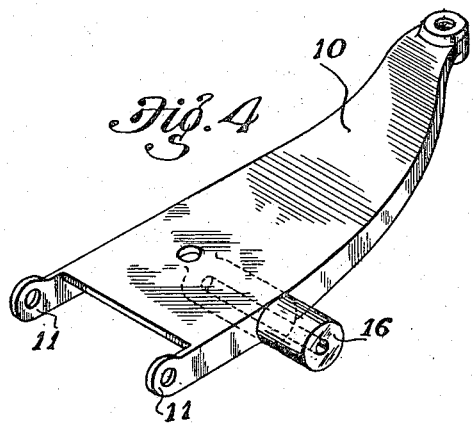
Figure 2:
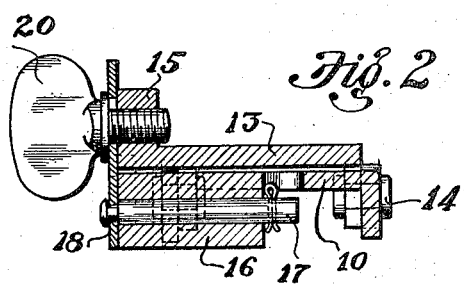

Figure 1 is a side elevation of a portable machine showing the improved caster thereon;

Fig. 2, a fragmentary section on line 2—2, Fig. 1;

Fig. 3, a perspective view of the bracket;

Fig. 4, a perspective view of the caster arm; and

Figure 5:
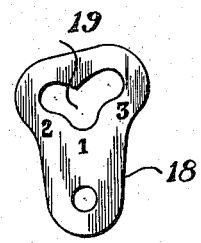

Fig. 5, an elevation of the adjusting plate.

Similar numerals of reference indicate corresponding parts throughout the several figures of the drawings.

For the purpose of illustrating the application of the invention to a portable machine, a vacuum cleaner of any usual type is illustrated and comprises the fan casing 1, having the usual suction cleaning nozzle 2 at its forward end and supporting the motor casing 3, the discharge neck 4 being located at the rear end of the casing and communicating with the dust collecting bag 5, a handle bail 6 being pivotally connected to opposite sides of the casing for the purpose of manipulating the machine to and fro upon the floor.

Machines of this type are usually provided with a caster 7 on each side in rear of the ends of the cleaning nozzle so that the same can be tilted upward or downward by lowering or raising the rear end of the machine; and for the purpose of limiting the downward movement, a rear caster 8 is usually employed.

By making this rear caster adjustable upward and downward with reference to the rear end of the machine and by providing means for holding the rear caster in the adjusted positions, the normal position of the nozzle with reference to the floor or carpet can be varied at will.

For the purpose of the present invention the rear caster is preferably mounted between the forks of the caster bracket 9, which is swivelly connected to the rear end of the caster arm 10, the forward end of said arm being provided with the ears 11 pivotally connected to the ears 12 of the bracket plate 13 by means of a pin 14.

The bracket 13 is fixed to the under side of the fan casing and is provided with the internally screw threaded lug 15 extending upward at one side of the casing. A bearing boss 16 is provided upon the adjacent side of the caster arm and receives the pin 17 upon which the adjusting plate 18 is journaled. This adjusting plate is provided with a substantially V-shaped slot 19 providing for three adjustments indicated at "1," "2" and "3" thereon and receives the clamping screw 20 which engages the threaded lug 15 upon the bracket.

The parts, are so arranged and proportioned that a turn upon the clamping screw to loosen the same will permit the adjusting plate to be swung upon its pivot to engage the points "1," "2" or "3" thereon with the clamping screw, raising or lowering the cleaning nozzle with reference to the floor. When the proper adjustment is provided, the screw 20 is tightened, holding the caster arm in the proper position.

It will be seen that in the normal or high position of the nozzle, the clamping screw 20 will rest in the apex of the inverted V-shaped slot at the point "1." When the clamping screw is moved to the point "3" at the extremity of the longer arm of the V-slot, the nozzle will be lowered to its lowest position, for use upon bare floors and the like while the intermediate position of the nozzle, adaptable for use upon short nap carpets, is obtained by locating the clamping screw at the point "2" at the extremity of the shorter arm of the V-slot. Intervening positions may be obtained by locating the clamping screw at the desired point in either of the arms of the V and tightening the screw to hold the casing in the desired adjustment.

By this construction and arrangement, it is evident that the caster arm with the rear caster thereon may be adjusted to and from the bottom of the vacuum cleaner by merely loosening the clamping screw and swinging the adjusting plate into the desired position, after which the clamping screw is tightened, so that when a particular adjustment is given to the arm, the screw will normally hold the same in the adjusted position and the vacuum cleaner may be lifted from the floor either bodily or at its rear end, without disturbing the adjustment of the caster arm.

I claim:—

1. In combination with a vacuum cleaner, an arm pivoted thereto at one end and having a caster in the other end, an adjusting plate pivoted upon the arm and provided with a slot, and a clamping screw upon the cleaner engaging said slot.

2. In combination with a vacuum cleaner, an arm pivoted thereto at one end and having a caster in the other end, an adjusting plate pivoted upon the arm and provided with a substantially V-shaped slot, and a clamping screw upon the cleaner engaging said slot.

3. In combination with a vacuum cleaner, an arm pivoted thereto at one end and having a caster in the other end, an adjustable plate pivoted upon the arm and provided with an inclined slot, and a clamping screw upon the cleaner engaging said slot.

WALTER S. SIMPSON.